J. L. STARKENBERG.
FOLDING BICYCLE.
APPLICATION FILED NOV. 3, 1917.
1,287,130.
Patented Dec. 10, 1918.
2 SHEETS—SHEET 1.
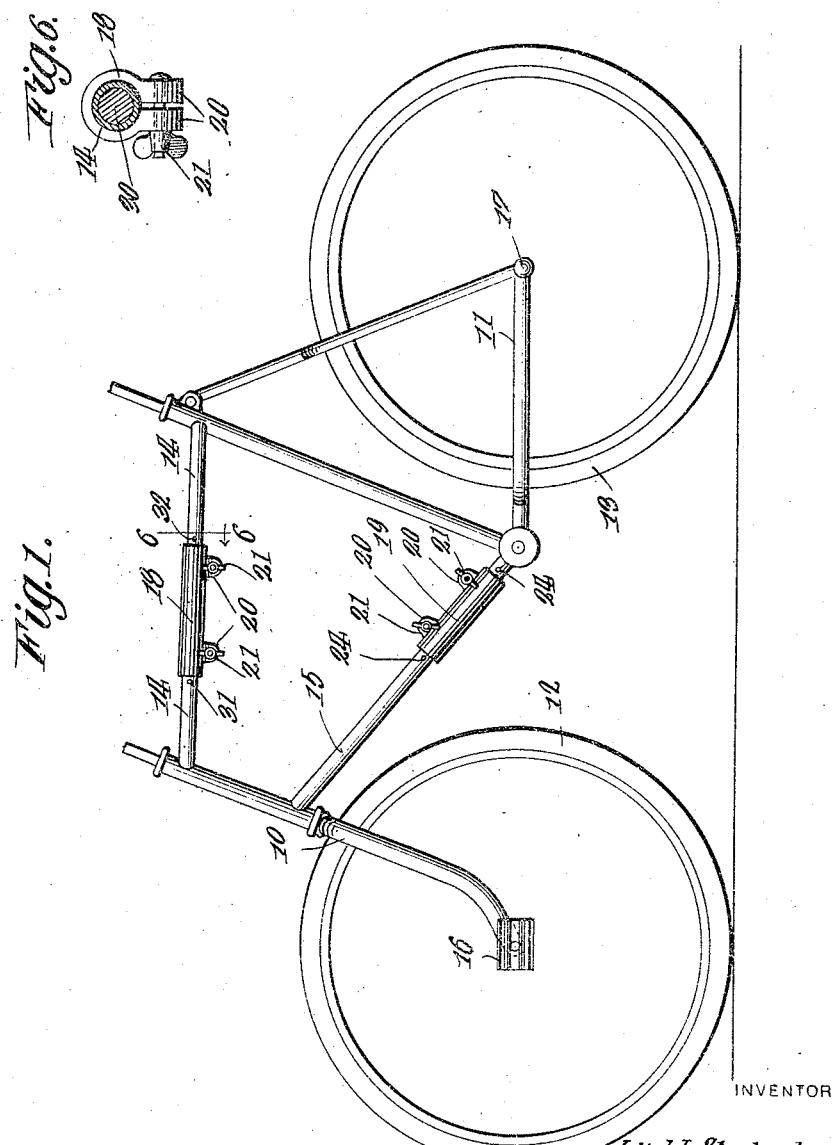
WITNESSES
Guy M. Spring
Thos. J. Woodward
INVENTOR
Jacob L. Starkenberg
BY Richard Owen.
ATTORNEY

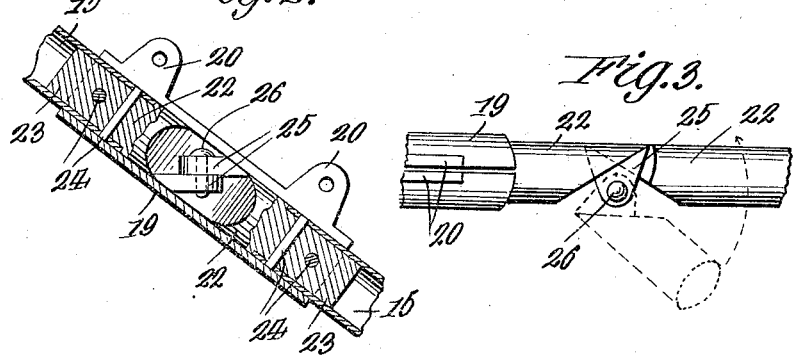

UNITED STATES PATENT OFFICE.

JAKOB L. STARKENBERG, OF BROOKLYN, NEW YORK.

FOLDING BICYCLE.

1,287,130.  Specification of Letters Patent.  Patented Dec. 10, 1918.

Application filed November 3, 1917. Serial No. 200,132.

*To all whom it may concern:*

Be it known that I, JAKOB L. STARKENBERG, a subject of the King of Sweden, residing at Brooklyn, in the county of Kings and State of New York, have invented certain new and useful Improvements in Folding Bicycles, of which the following is a specification.

This invention relates to an improved folding bicycle and the principal object of the invention is to so construct the frame of the bicycle that it may be folded thus permitting the bicycle to be stored in a comparatively small amount of space and to further so construct this bicycle that when in use, the frame will be strong and not liable to collapse.

Another object of the invention is to so construct the bicycle that the joints permitting folding may be covered by protecting and strengthening sleeves slidably mounted upon the tubular bars of the frame and releasably held in a set position.

Another object of the invention is to so construct the improved joints for the folding frame that they will be strong and durable and comparatively simple in construction.

This invention is illustrated in the accompanying drawings, wherein:—

Figure 1 is a view showing a bicycle frame in side elevation and provided with the improved construction, Fig. 2 is a fragmentary view showing the joints for the upper cross bar in longitudinal section, Fig. 3 is a top plan view of the joint portion of the upper cross bar with the sleeves removed to permit folding.

Fig. 4 is a view similar to Fig. 3 showing the joint of the lower cross bar.

Fig. 5 is a view showing the joint portion of the lower cross bar with the sleeve moved to permit folding, the view being shown partially in top plan and partially in section.

Fig. 6 is a sectional view taken along the line 6—6 of Fig. 1.

Fig. 7 is a fragmentary view showing a latch used in connection with the folding bicycle frame.

This bicycle is provided with a frame including the forward forks 10, rear forks 11 for the forward and rear wheels 12 and 13, and upper and lower cross bars 14 and 15. The clamp or socket 16 is carried by one of the forward forks and is intended to engage the stud or head 17 extending from the axle of the rear wheel 13 thus providing means for releasably holding the frame in a folded position after the frame has been folded as will hereinafter be brought out.

The upper and lower cross bars 14 and 15 are not formed as solid tubing as is usually the case in the construction of a bicycle but are broken and the sections connected by hinges so that this frame may be doubled intermediate its length. The hingedly connected end portions and the hinge elements are inclosed by the sleeves 18 and 19 which sleeves fit loosely upon the tubes and are formed of resilient material and provided with ears or extensions 20 through which extend fasteners 21. When these fasteners are tightened the sleeves will be tightly clamped to the tubular bars and the hingedly connected portions thereof will be inclosed and securely braced and held against movement independent of each other. The hinge for the lower cross bar 15 is formed in two sections or blocks 22 having reduced end portions 23 fitting into the sections of the tubular cross bar and secured by the rivets or other fasteners 24. The outer or adjoining end portions of the blocks 22 are provided with hinge ears 25 positioned in overlapping relation and connected by the pivot pin 26 thus permitting one end portion or block of the hinge element to be swung to the position indicated in dotted lines in Fig. 3. It will thus be seen that the lower cross bar 15 may be folded with the forward end portion thereof moving rearwardly to bring the front wheel parallel to the rear wheel.

The upper cross bar 14 is also formed in two sections hingedly connected by a hinge element which hinge element is provided with end sections 27 and 28, the end portions 29 and 30 of which are reduced and fitted into the tubular sections of the upper cross bar and secured by rivets or other fasteners 31 and 32. The link or plate 33 extends into the slot 34 of the block or hinge section 28 and is pivotally mounted therein through the medium of the pivot pin 35 so that this link may be swung to the position indicated by dotted lines in Fig. 5. The outer end portion of this link is pivotally connected with the end block 27 by pivot pin 36 thereby permitting the forward portion of the upper cross bar to have the proper movement when folding the frame.

From the above description it will be readily seen that when the protecting and strengthening sleeves 18 and 19 are in the position shown in Figs. 1, 2 and 4, the upper and lower cross bars will be securely held in the extended position and there will be no danger of the bicycle frame collapsing while in use. It will be further seen that when it is desired to store the bicycle, the fasteners 21 can be released thus permitting the sleeves to be moved to the position shown in Figs. 3 and 5 thereby uncovering the joints of the upper and lower cross bars and permitting the bicycle frame to be folded. The provision of the socket 16 mounted upon the front fork at the axle of the front wheel, and the head 17 upon the rear fork at the axle of the rear wheel provide a snap fastener for releasably holding the frame in the folded position.

What is claimed is:—

1. A bicycle frame including a cross bar having end sections terminating in spaced relation, a hinge element pivotally connecting the end sections of the cross bar and provided with end sections connected with the end sections of the cross bar and having their adjoining ends provided with pivotally connected hinge ears, and means for releasably holding the hinge element against folding.

2. A bicycle frame including a cross bar formed of two members hinged together intermediate the ends of said bar, the adjacent ends of said members being inclined from each other on the same side of the cross bar, an ear projecting from the inclined face of each of said hinged elements and overlapping, a pivot pin connecting said overlapping ears, and a sleeve slidable on said cross bar and adapted to be clamped around the hinged connection between the cross bar members to hold said members rigid.

3. A bicycle frame including upper and lower cross bars, hinge elements connecting the end portions of the upper and lower cross bars for transverse folding of the frame, forward and rear forks for the frame, a stud extending to one side of one set of forks, and a socket extending to one side of the second set of forks for engaging the stud and releasably holding the frame in a folded position.

In testimony whereof I affix my signature in presence of two witnesses.

JAKOB L. STARKENBERG.

Witnesses:
ELIAS NASSRA,
GUNDER A. RÖBERG.

Copies of this patent may be obtained for five cents each, by addressing the "Commissioner of Patents, Washington, D. C."